United States Patent [19]

Miyazaki et al.

[11] Patent Number: 4,601,448
[45] Date of Patent: Jul. 22, 1986

[54] HOSE MIDWAY HOLDER

[75] Inventors: Takeshi Miyazaki, Inazawa; Kenji Sugiyama, Gifu, both of Japan

[73] Assignee: Toyoda Gosei Co., Ltd., Nishikasugai, Japan

[21] Appl. No.: 632,656

[22] Filed: Jul. 20, 1984

[30] Foreign Application Priority Data

Jul. 20, 1983 [JP] Japan .................. 58-132191

[51] Int. Cl.⁴ .................................................. F16L 5/00
[52] U.S. Cl. ........................................ 248/56; 285/61
[58] Field of Search .................. 248/56, 75, 65, 79; 285/61, 62, 162; 403/197; 174/153 G, 65 G, 152 G; 16/2

[56] References Cited

U.S. PATENT DOCUMENTS

| | | | |
|---|---|---|---|
| 1,056,392 | 3/1913 | Barr et al. ...................... | 16/2 X |
| 1,736,999 | 11/1929 | Davis ............................ | 16/2 |
| 1,949,668 | 3/1934 | Weatherhead ................. | 285/62 |
| 3,937,499 | 2/1976 | Courtot ......................... | 285/61 X |
| 4,002,822 | 1/1977 | Kurosaki ....................... | 248/56 X |
| 4,144,616 | 3/1979 | Gould et al. ................... | 248/56 X |
| 4,346,863 | 8/1982 | Zeitrager ....................... | 248/56 X |

FOREIGN PATENT DOCUMENTS 1294510 11/1972 United Kingdom .......... 174/153 G

Primary Examiner—J. Franklin Foss
Attorney, Agent, or Firm—Cushman, Darby & Cushman

[57] ABSTRACT

The hose midway holder comprising: a tubular body adapted to be fixed on a hose; a flange adapted to abut against the peripheral edge of a mounting hole of a mounting fixture and formed, if necessary, at its outer peripheral face with at least one flattened face where it is fitted in the mounting hole of the mounting fixture; and a groove in which is to be fitted a fixing clip for clamping the peripheral edge of the mounting hole of the mounting fixture together with the flange. The hose midway holder itself is made of a pipe material and has at least its flange formed by plastic deformation.

4 Claims, 11 Drawing Figures

PRIOR ART
Fig.1
PRIOR ART
Fig.2
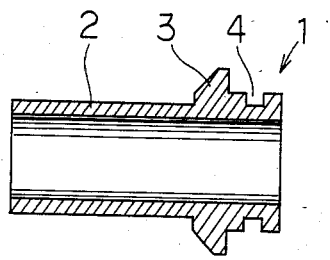
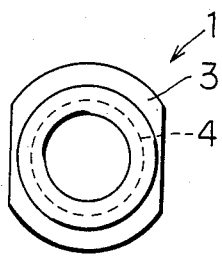
Fig.3
Fig.4
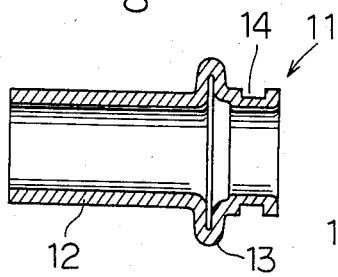
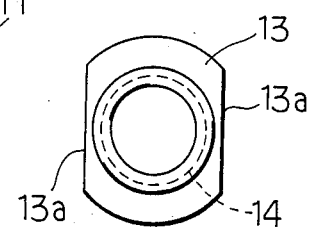
Fig.8
Fig.9
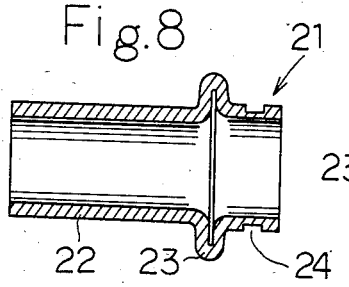
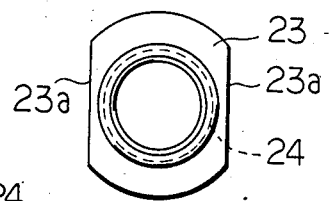
Fig.10
Fig.11
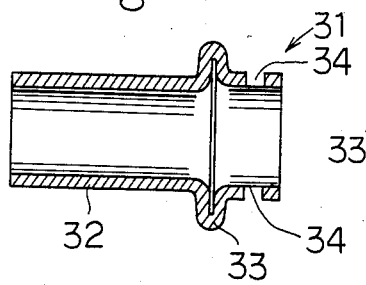
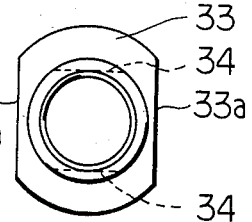

4,601,448

HOSE MIDWAY HOLDER

BACKGROUND OF THE INVENTION

1. Field of the Invention

The present invention relates to a hose midway holder which is used when it is fixed on a hose to mount the hose on a mounting fixture.

2. Description of the Prior Art

A hose midway holder 1 of the above-specified kind according to the prior art is constructed, as shown in FIGS. 1 and 2, of: a tubular body 2 adapted to be fixed on a hose; a flange 3 adapted to abut against the peripheral edge of a mounting hole of a mounting fixture; and a groove 4 in which is to be fitted a fixing clip for clamping the peripheral edge of the mounting hole of said mounting fixture together with said flange 3. The hose midway holder 1 thus constructed is produced in its entirety by machining a rod.

Since the hose midway holder 1 of the prior art is wholly made of a rod by the machining operation, the rod is machined so much that as high as 70 to 80% of the material is wasted, thus degrading the yield and it takes a long time and a large amount of energy to work the rod material, thus raising the production cost.

SUMMARY OF THE INVENTION

An object of the present invention is to provide a hose midway holder comprising: a tubular body adapted to be fixed on a hose; a flange adapted to abut against the peripheral edge of a mounting hole of a mounting fixture and formed, if necessary, at its outer peripheral face with at least one flattened face where it is fitted in the mounting hole of said mounting fixture; and a groove in which is to be fitted a fixing clip for clamping the peripheral edge of the mounting hole of said mounting fixture together with said flange, wherein the improvement resides in that said hose midway holder is made of a pipe material and has at least its flange formed by plastic deformation, whereby said hose midway holder can have a high yield, a short working time and a low working energy so that its production cost can be brought down.

BRIEF DESCRIPTION OF THE DRAWINGS

FIG. 1 is a sectional view showing the hose midway holder according to the prior art;

FIG. 2 is a side elevation showing the hose midway holder of the prior art;

FIG. 3 is a sectional view showing a hose midway holder according to a first embodiment of the present invention;

FIG. 4 is a side elevation showing the hose midway holder of the first embodiment;

FIG. 8 is a sectional view showing a hose midway holder according to a second embodiment of the present invention;

FIG. 9 is a side elevation showing the hose midway holder of the second embodiment;

FIG. 10 is a sectional view showing a hose midway holder according to a third embodiment of the present invention; and FIG. 11 is a side elevation showing the hose midway holder of the third embodiment.

DESCRIPTION OF THE PREFERRED EMBODIMENTS

Figure 5:
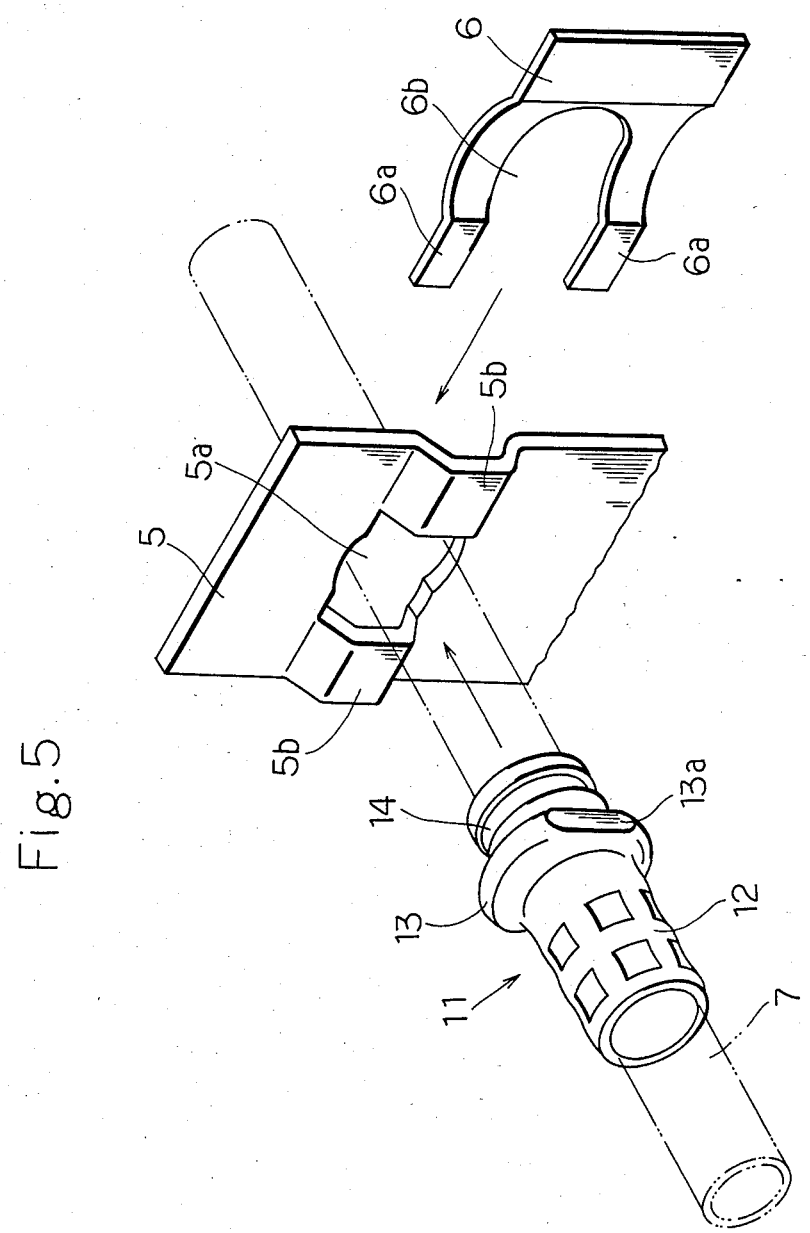
FIG. 5 is an exploded perspective view showing the mode of using the hose midway holder of the first embodiment.

A hose midway holder 11 according to a first embodiment is formed from a pipe material which has such an internal diameter that it can be fixed on a hose and which is made of either metal such as steel, brass or aluminum, or a non-metallic material such as a synthetic resin or a reinforced synthetic resin having glass fibers mixed therein. After the pipe material is cut to a predetermined length, it is plastically deformed in the vicinity of its end portion by a bulging operation to form a flange 13. The pipe material is further plastically deformed at its back by a flaring operation to form a groove 14. And, the portion of the pipe material left without being subject to the bulging and flaring operations provides a tubular body 12. Moreover, the flange 13 of the embodiment is formed at its outer peripheral face with two flattened faces 13a and 13a simultaneously with the bulging operation so that it can function to come into a mounting hole of a mounting fixture to stop any rotation of a hose when the hose midway holder 11 is fixed on a hose and is mounted in the mounting hole.

Figure 6:
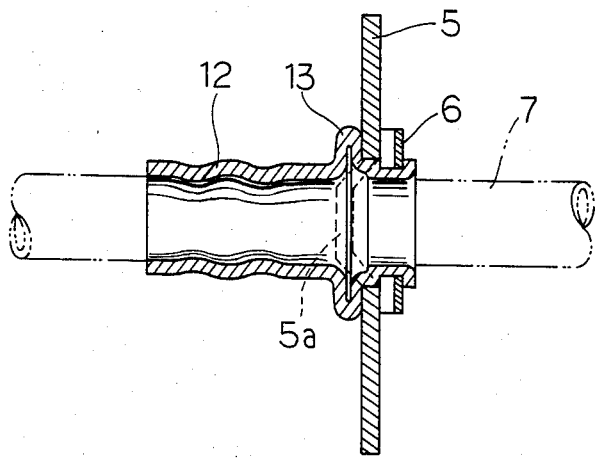
FIG. 6 is a sectional view showing the using mode of the hose midway holder of the first embodiment.
Figure 7:
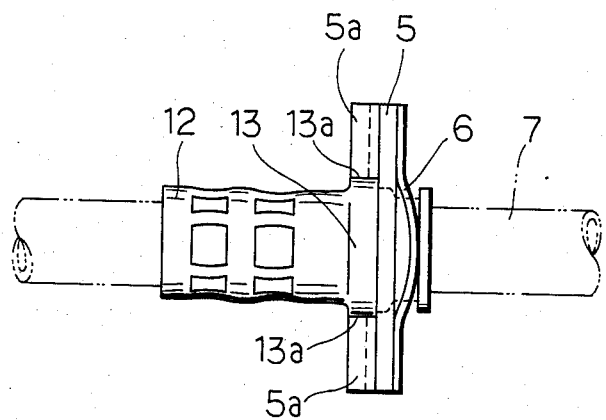
FIG. 7 is a top plan view showing the using mode of the hose midway holder of the first embodiment.

The mode of using the hose midway holder 11 of the embodiment will be described in the following (with reference to FIGS. 5 to 7). The hose midway holder 11 is placed in position on a hose 7 and is fixed thereon by caulking (i.e. crimping, squeeze-forming) or adhering the tubular body 12. Then, the hose 7 is inserted together with its midway holder 11 into a mounting hole of a mounting fixture 5. Moreover, this mounting fixture 5 has its mounting hole 5a sized so that it can abut against the flange 13 of the hose midway holder 11, and is formed at the peripheral edge of the mounting hole 5a with bulging portions 5b and 5b which can have their side end faces abutting against the flattened faces 13a of the flange 13.

Thus, the hose 7 is inserted together with the hose midway holder 11 into the mounting hole 5a of the mounting fixture 5 to bring the flange 13 into abutment against the peripheral edge of the mounting hole 5a and the flattened faces 13a and 13a into abutment against the end faces of the bulging portions 5b and 5b. Then, a fixing clip 6 is fitted into the groove 14 to mount the hose 7 in the mounting fixture 5. Specifically, the fixing clip 6 is formed with a U-shaped groove 6b to leave two tongues 6a 6a, which are curved and sized to be fitted in the groove 14 of the hose midway holder 11. When fitted in the groove 14, the fixing clip 6 clamps the peripheral edge of the mounting hole 5a of the mounting fixture 5 together with the flange 13 so that the hose 7 and the hose midway holder 11 are prevented from coming out from the mounting fixture 5.

Thus, as is different from the prior art in which the hose midway holder is wholly made of a rod by the cutting operation, the hose midway holder 11 according to the first embodiment is produced to have its flange 13 and its groove 14 prepared by plastically deforming the pipe material by the bulging and flaring operations. As a result, when the pipe material is to be cut to the predetermined length, the machining operation required is limited to that for treating the end faces so that the pipe material can be used up to substantially 100% without waste to improve the yield, shorten the working time and to reduce the working energy required so that the production cost can be brought down. Moreover, since the flange 13 and the groove 14 are formed not by a machining operation but by plastic derformation so that the flow of the material is formed by profiling the shape of the hose midway holder 11, the product can have an improved strength.

Hose midway holders 21 and 31 according to second and third embodiments are formed from pipe materials like that of the first embodiment and have their flanges 23 and 33 plastically deformed by bulging operations but have their grooves 24 and 34 formed by the machining. The yield, the working time and so on are not as favorable as those of the first embodiment to an extent required for machining the grooves 24 and 34. Since these grooves 24 and 34 naturally occupy small positions, however, there can be attained an advantage over the prior art that the production cost can be brought down while retaining the strength as a result of the improved yield, the shortened working time and the reduced working energy. These hose midway holders 21 and 31 of the second and third embodiments are used in a mode similar to that of the first embodiment.

Incidentally, the flanges 13, 23 and 33 of the hose midway holders according to the first to third embodiments are formed with flattened faces 13a, 23a and 33a so as to stop rotation of the hoses. If these stopping functions need not be considered, however, those flattened faces can be dispensed with.

Moreover, the hose midway holders 21 and 31 of the second and third embodiments are formed with the grooves 24 and 34 and the flanges 23 and 33 which are located from the end portions in the recited orders. However, these locations of the grooves and the flanges may naturally be reversed.

What is claimed is:

1. A hose midway holder comprising:
   a tubular body adapted to be fixed on a hose;
   a flange adapted to abut against the peripheral edge of a mounting hole of a mounting fixture; and
   a groove in which is to be fitted a fixing clip for clamping the peripheral edge of the mounting hole of said mounting fixture together with said flange,
   said hose midway holder being made of a pipe material and said flange existing as an outwardly bulging, inwardly recessed plastic deformation of said pipe material.

2. A hose midway holder as set forth in claim 1 wherein said groove also exists as a plastic deformation of said pipe material.

3. A hose midway holder comprising:
   a tubular body adapted to be fixed on a hose;
   a flange adapted to abut against the peripheral edge of a mounting hole of a mounting fixture and formed at its outer peripheral face with at least one flattened face where it is fitted in the mounting hole of said mounting fixture; and
   a groove in which is to be fitted a fixing clip for clamping the peripheral edge of the mounting hole of said mounting fixture together with said flange,
   said hose midway holder being made of a pipe material and said flange existing as an outwardly bulging, inwardly recessed plastic deformation of said pipe material.

4. A hose midway holder as set forth in claim 3, wherein said groove also exists as a plastic deformation of said pipe material.

* * * * *